US009006945B2

(12) United States Patent
Miyauchi et al.

(10) Patent No.: US 9,006,945 B2
(45) Date of Patent: Apr. 14, 2015

(54) ROTATING ELECTRICAL MACHINE AND ROTATING APPARATUS

(75) Inventors: Nobukazu Miyauchi, Kitakyushu (JP); Toshiyuki Yamagishi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 341 days.

(21) Appl. No.: 13/356,651

(22) Filed: Jan. 24, 2012

(65) Prior Publication Data

US 2012/0194018 A1 Aug. 2, 2012

(30) Foreign Application Priority Data

Feb. 2, 2011 (JP) .................................. 2011-020475

(51) Int. Cl.
*H02K 5/16* (2006.01)
*H02K 7/08* (2006.01)
*H02K 7/102* (2006.01)
*H02K 7/116* (2006.01)

(52) U.S. Cl.
CPC .............. *H02K 7/081* (2013.01); *H02K 7/1025* (2013.01); *H02K 7/1166* (2013.01)
USPC ............................... 310/90; 310/75 D; 310/98

(58) Field of Classification Search
CPC .... H02K 7/081; H02K 7/1166; H02K 7/1025
USPC ................. 310/71, 75 D, 90, 98, 99
See application file for complete search history.

(56) References Cited

U.S. PATENT DOCUMENTS

| 5,089,736 A * | 2/1992 | Oyafuso ........................ 310/90 |
| 5,144,738 A * | 9/1992 | Oyafuso ........................ 29/596 |
| 5,216,307 A * | 6/1993 | Hosoya ......................... 310/90 |
| 6,707,188 B2 * | 3/2004 | Torii et al. .................. 310/75 R |
| 6,922,006 B2 * | 7/2005 | Nomerange .................. 310/328 |
| 2007/0278874 A1 | 12/2007 | Abousleiman et al. |
| 2011/0000737 A1 | 1/2011 | Nagase et al. |

FOREIGN PATENT DOCUMENTS

| CN | 101075763 | 11/2007 |
| JP | 03-126545 U | 12/1991 |
| JP | 08-289502 | 11/1996 |
| TW | 468737 | 12/2001 |
| TW | 539079 | 6/2003 |
| WO | WO 2009/101788 | 8/2009 |

OTHER PUBLICATIONS

Japanese Office Action for corresponding JP Application No. 2011-020475, Apr. 19, 2013.

(Continued)

*Primary Examiner* — Thanh Lam
(74) *Attorney, Agent, or Firm* — Mori & Ward, LLP

(57) ABSTRACT

This disclosure discloses a rotating electrical machine that is integrally formed with a reduction device having an input shaft and an output shaft and employs one of a field system and an armature as a rotor and the other of the field system and the armature as a stator, including a rotating shaft to which the rotor is fixed and that is coaxially connected to the input shaft of the reduction device, and a bearing support member configured to support bearings that rotatably support the input shaft of the reduction device, wherein the stator is provided to the bearing support member.

11 Claims, 9 Drawing Sheets

(56) References Cited

OTHER PUBLICATIONS

Chinese Office Action for corresponding CN Application No. 201210021655.8, Sep. 18, 2014.

Taiwanese Office Action for corresponding TW Application No. 101103375, Dec. 22, 2014.

* cited by examiner

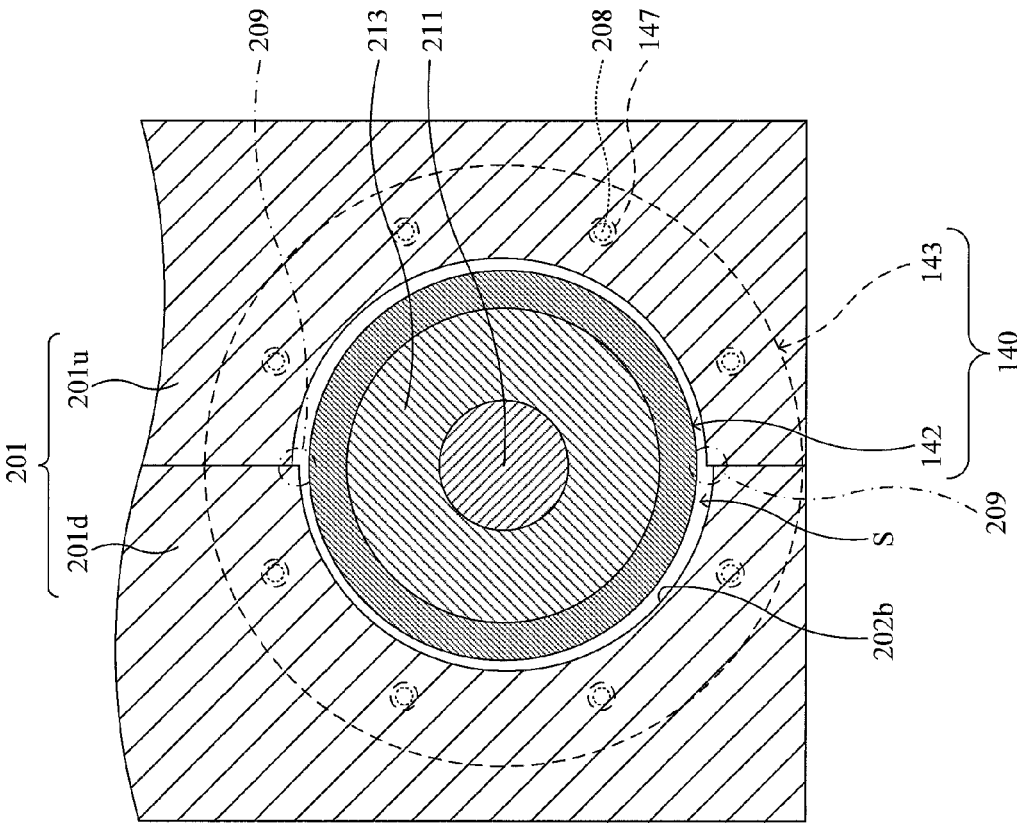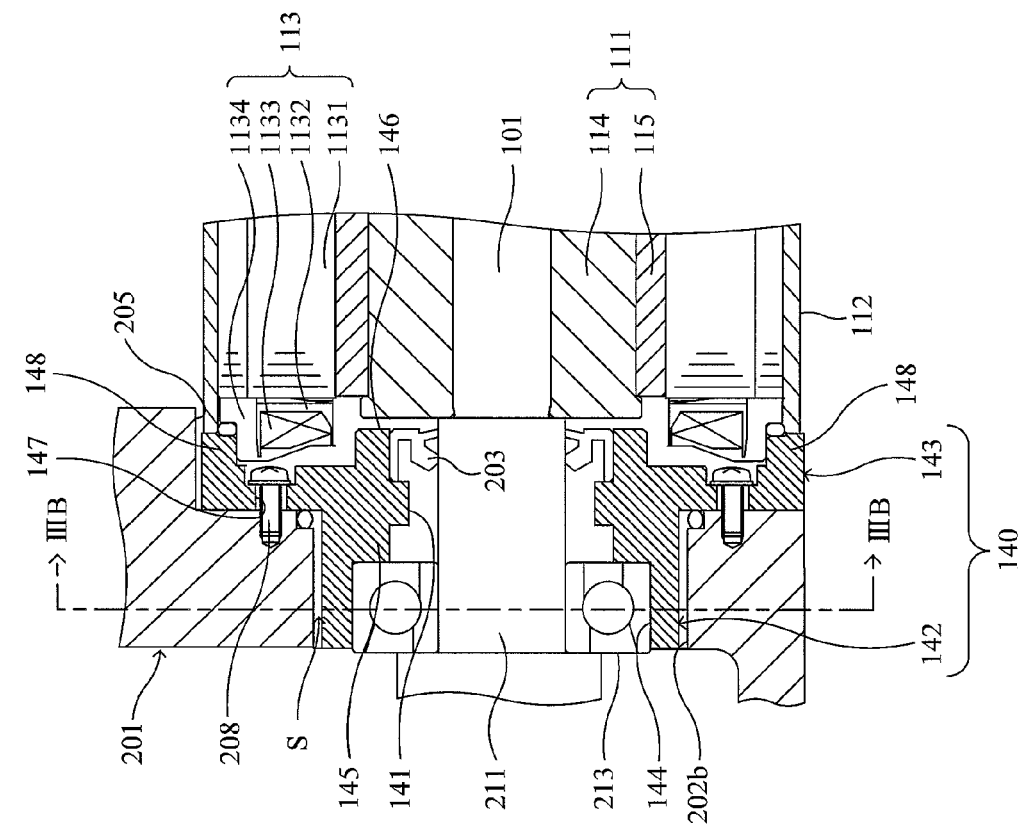

1

ROTATING ELECTRICAL MACHINE AND ROTATING APPARATUS

CROSS-REFERENCE TO RELATED APPLICATION

The present application claims priority from Japanese Patent Application No. 2011-020475, which was filed on Feb. 2, 2011, the disclosure of which is incorporated herein by reference in its entirety.

BACKGROUND OF THE INVENTION

1. Field of the Invention

The present invention relates to a rotating electrical machine used for a drive source of a rotary table device or the like, and a rotating apparatus comprising said rotating electrical machine.

2. Description of the Related Art

In prior art, in the machine tool field, for example, a rotating apparatus comprising a rotating electrical machine and reduction device has been used.

SUMMARY OF THE INVENTION

The aspect of the present invention discloses a rotating electrical machine that is integrally formed with a reduction device having an input shaft and an output shaft, and employs one of a field system and an armature as a rotor and the other of the field system and the armature as a stator, comprising: a rotating shaft to which the rotor is fixed and that is coaxially connected to the input shaft of the reduction device, and a bearing support member configured to support bearings that rotatably support the input shaft of the reduction device, wherein the stator is provided to the bearing support member.

The aspect of the present invention further discloses a rotating apparatus that integrally comprises a reduction device wherein an input shaft and an output shaft are arranged in parallel, and a rotating electrical machine having one of a field system and an armature as a rotor and the other of the field system and the armature as a stator, wherein: the rotating electrical machine comprises: a rotating shaft to which the rotor is fixed and that is coaxially connected to the input shaft of the reduction device, and a bearing support member configured to support bearings that rotatably support the input shaft of the reduction device, and wherein the stator is provided to the bearing support member.

BRIEF DESCRIPTION OF THE DRAWINGS

FIG. 3A is a partially enlarged view of the area near the bearing support member within the longitudinal sectional view of the rotating apparatus shown in FIG. 1.

FIG. 3B is cross-sectional view along line IIIB-IIIB in FIG. 3A.

DETAILED DESCRIPTION OF THE EMBODIMENTS

The following describes an embodiment of the disclosure with reference to accompanying drawings.

Figure 1:
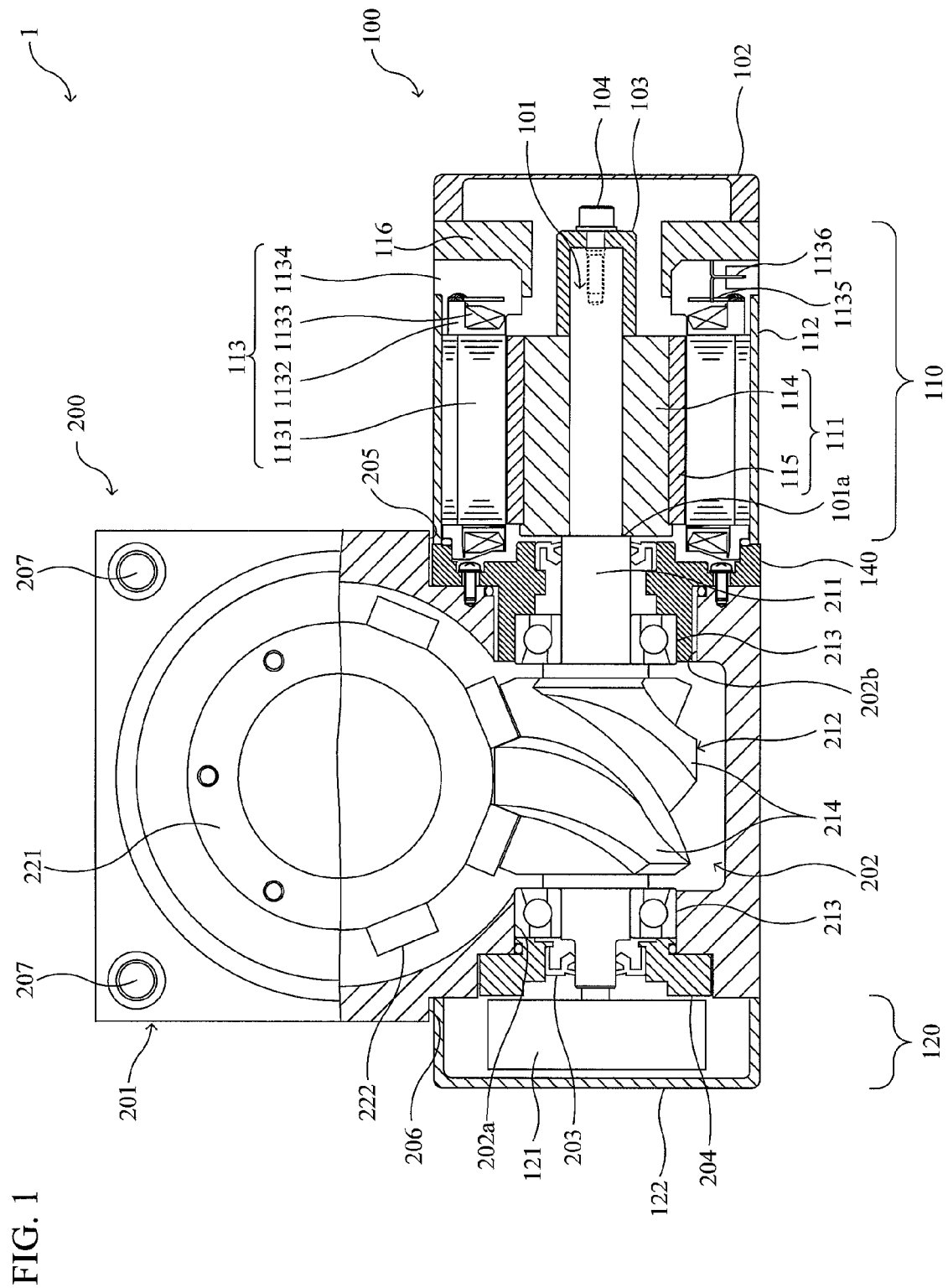
FIG. 1 is a longitudinal sectional view illustrating the overall configuration of a rotating apparatus according to an embodiment of the disclosure.
Figure 2:
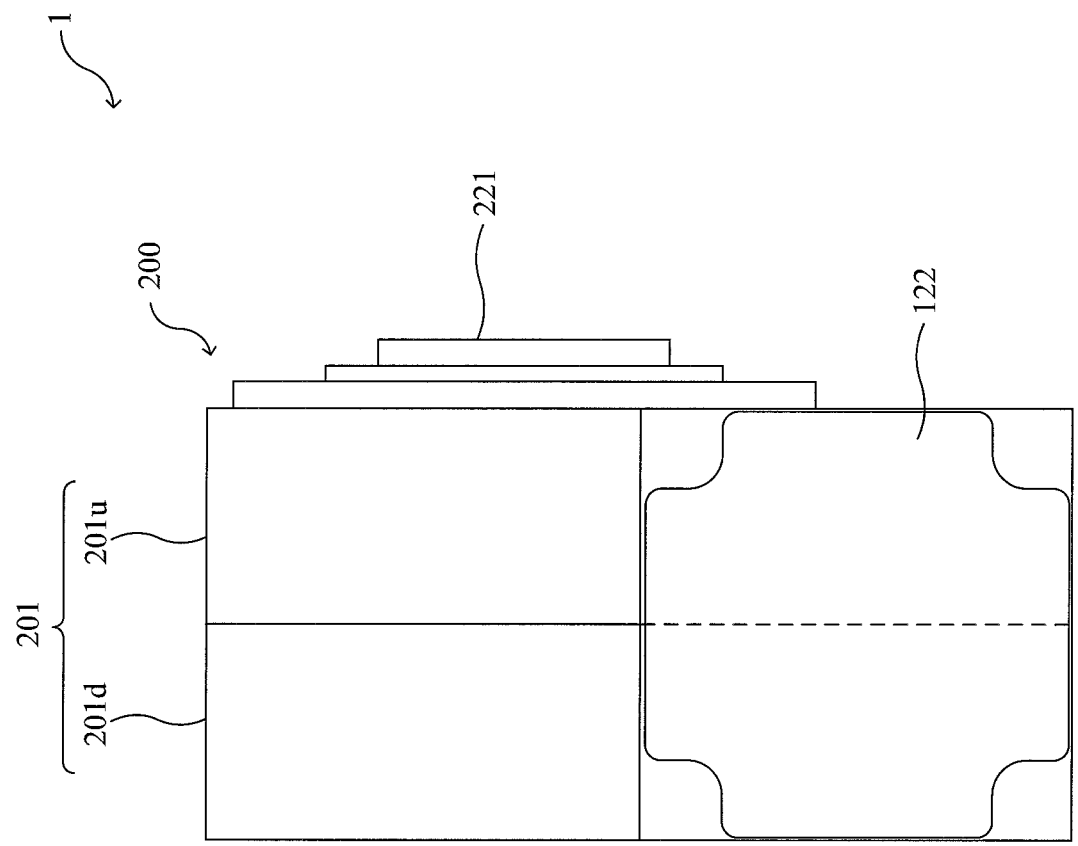
FIG. 2 is a side view from the encoder portion side illustrating the overall configuration of a rotating apparatus according to an embodiment of the disclosure.

First, the overall configuration of the rotating apparatus of the embodiment of the disclosure will be described using FIG. 1 and FIG. 2. FIG. 1 is a longitudinal sectional view illustrating the overall configuration of a rotating apparatus according to an embodiment of the disclosure. FIG. 2 is a side view from the encoder portion side illustrating the overall configuration of a rotating apparatus according to an embodiment of the disclosure.

As shown in FIG. 1, a rotating apparatus 1 integrally comprises a motor 100 as a rotating electrical machine, and a reduction device 200. The motor 100 comprises a motor electromagnetic portion 110 and an encoder portion 120. The reduction device 200 is disposed between the motor electromagnetic portion 110 and the encoder portion 120.

The motor electromagnetic portion 110 comprises a rotor 111 and a stator 113. The rotor 111 is fixed coaxially with a rotating shaft 101. The stator 113 is fixed to a motor frame 112 so that it lies opposite the outer peripheral surface of this rotor 111 in the radial direction. The rotating shaft 101 is integrally formed into a single shaft with an input shaft 211 of the reduction device 200.

The rotor 111 comprises a yoke 114 and a magnet 115. The rotor 111 is inserted from the side of the rotating shaft 101 that is the side opposite to the reduction device 200 (the opposite side of the load; the right side in FIG. 1), and is adhered and fixed to the outer periphery of the rotating shaft 101. At the time of insertion, a step portion 101a formed between the input shaft 211 and the rotating shaft 101 fulfills the role of a butting surface of the rotor 111. A yoke presser 103 is provided to the shaft end portion of the rotating shaft 101. This yoke presser 103 is formed into a closed-end cylinder shape. The yoke presser 103 is fixed by a bolt 104 so that it covers the shaft end portion of the rotating shaft 101. The yoke presser 103 pre-compresses the yoke 114 toward the reduction device 200 side (the load side; the left side in FIG. 1), preventing the yoke 114 from shifting position in the axial direction of the rotating shaft 101.

The stator 113 comprises a laminated core 1131, a bobbin 1132, a coil wire 1133, a wire connecting substrate 1135 of the coil wire 1133, and an input terminal 1136. The laminated core 1131 is inserted through the bobbin 1132. The coil wire 1133 is wrapped around the bobbin 1132. The input terminal 1136 is connected to the wire connecting substrate 1135. The bobbin 1132 is made of an insulating material such as resin for electrically insulating the laminated core 1131 and the coil wire 1133. The laminated core 1131, the bobbin 1132, the coil wire 1133, the wire connecting substrate 1135, and the input terminal 1136 are molded using a resin 1134. A bracket 116 is provided to the stator 113, on the side opposite to the reduction device 200. Further, a cover 102 is provided to the bracket 116, on the side opposite to the reduction device 200.

The encoder portion 120 is disposed opposite the motor electromagnetic portion 110, sandwiching the reduction device 200. The encoder portion 120 comprises an optical or magnetic encoder 121 and an encoder cover 122 that covers this encoder 121, for example. The encoder 121 detects the angle of rotation, etc., of the rotating shaft 101.

Subsequently, the reduction device 200 will be described. The reduction device 200 is a so-called roller gear reduction device. The reduction device 200 comprises the input shaft 211, an output shaft 221, and a housing 201. A roller gear cam 212 is provided to the input shaft 211. A cam follower 222 that sequentially engages with the roller gear cam 212 is provided to the outer periphery of the output shaft 221. The input shaft 211 and the output shaft 221 are arranged in the interior of the housing 201 so that the axial direction of each shaft is substantially orthogonal, and the positional relationship is skewed.

The input shaft 211 is rotatably supported with respect to the housing 201 by bearings 213 disposed on both axial sides. The roller gear cam 212 is integrally provided to the input shaft 211. A spiral-shaped taper rib 214 is formed on this roller gear cam 212. Axial displacement is uniformly provided in accordance with the angle of rotation to the taper rib 214. Further, as described above, the input shaft 211 is integrally formed into a single shaft with the rotating shaft 101 of the motor 100.

The output shaft 221 is a hollow shaft. The output shaft 221 is rotatably supported with respect to the housing 201 by bearings (not shown) disposed on both axial sides. A plurality of the cam followers 222 is radially provided at a predetermined interval on the outer peripheral surface of the output shaft 221, along the circumferential direction. Two of these cam followers 222 adjacently disposed are sequentially pre-compressed toward and come in contact with both side surfaces of the taper rib 214 in accordance with the rotation of the roller gear cam 212. With this arrangement, the rotation of the input shaft 211 is decelerated and transmitted to the output shaft 221.

As shown in FIG. 2, the housing 201 has a structure that is splittable in the direction orthogonal to the axial direction of the input shaft 211 (that is, the axial direction of the output shaft 221; the horizontal direction in FIG. 2). The housing 201 comprises two housing portions, namely a first housing portion 201u and a second housing portion 201d. The first housing portion 201u and the second housing portion 201d are connected by a bolt 207 (refer to FIG. 1). Further, the housing 201 comprises a through-hole 202 through which the input shaft 211 is inserted. The bearings 213 are provided to a through-hole 202a of the through-hole 202 that is on the encoder portion 120 side. An oil seal 203 and an oil seal holder 204 are provided to the bearings 213, on the shaft end side (the left side in FIG. 1). The oil seal holder 204 supports the oil seal 203 and provides pre-compression to the bearings 213. Further, the axial end side of the through-hole 202a is open on the surface of the housing 201. An encoder cover 132 is fixed to a predetermined position on this opening 206.

A bearing support member 140 is provided to a through-hole 202b of the through-hole 202, on the side of the motor electromagnetic portion 110. The bearing support member 140 supports and pre-compresses the bearings 213. Note that, in a case where the bearings 213 are bearings that do not need to be pre-compressed (cylindrical roller bearings, for example), the bearing support member 140 supports the bearings 213 without applying pre-compression. The axial end side (the right side in FIG. 1) of the through-hole 202b increases in diameter and is open on the surface of the housing 201. The motor electromagnetic portion 110 is positioned and fixed to a predetermined position on this opening 205, via the bearing support member 140.

Subsequently, the bearing support member 140 will be described using FIG. 3. FIG. 3A is a partially enlarged view of the area near the bearing support member within the longitudinal cross-sectional view of the rotating apparatus shown in FIG. 1, and FIG. 3B is a cross-sectional view corresponding to a line IIIB-IIIB in FIG. 3A.

As shown in FIG. 3A and FIG. 3B, the bearing support member 140 is a circular member comprising a through-hole 141 at the center, through which the input shaft 211 is inserted. This bearing support member 140 comprises a support portion 142 and a flange portion 143. The outer diameter of the support portion 142 is smaller than the inner diameter of the through-hole 202b of the aforementioned housing 201, on the side of the motor electromagnetic portion 110. The outer diameter of the flange portion 143 is larger than the inner diameter of the through-hole 202b. With the bearing support member 140 fixed to the through-hole 202b of the housing 201, the support portion 142 is inserted into the through-hole 202b. Further, the flange portion 143 is arranged inside the opening 205 in this example, outside the through-hole 202b. At this time, the outer diameter of the support portion 142 is smaller than the inner diameter of the through-hole 202b, forming a gap S between the outer periphery of the support portion 142 and the inner periphery of the through-hole 202b.

The reduction device 200 side (the left side in FIG. 3A) of the through-hole 141 increases in diameter and is open on the surface of the bearing support member 140, on the reduction device 200 side (the left side in FIG. 3A). An opening 144 functions as a fitting portion to which the bearings 213 are fit. The support portion 142 supports the bearings 213 when the bearings 213 are fit to the opening 144. Note that a step portion 145 is formed between the through-hole 141 and the opening 144 by the difference in hole diameters, and this step portion 145 pre-compresses the bearings 213.

The oil seal 203 is provided to the through-hole 141 on the side opposite to the reduction device 200 (the right side in FIG. 3A). This oil seal 203 is supported by an oil seal holder portion 146 provided in a circular shape to the center of the flange portion 143 in the diameter direction.

A bolt hole 147 through which a bolt 208 is inserted in order to fix the bearing support member 140 is formed on the flange portion 143 in a plurality of locations (8 locations in this example) in the peripheral direction. The diameter of the bolt hole 147 is formed larger than the bolt 208, forming a gap around the periphery of the bolt 208, within each of the bolt holes 147. The bolt 208 is inserted through the bolt hole 147 formed on the flange portion 143, and is connected to the housing 201. With this arrangement, the bearing support member 140 is fixed to the through-hole 202b of the housing 201.

Further, the flange portion 143 comprises a convex portion 148 (inlaying and connecting portion) formed in a circular shape coaxial with the oil seal holder portion 146 on the outer peripheral side in the diameter direction. Note that the inlaying and connecting portion is not limited to a convex shape, allowing a concave shape. This convex portion 148 is formed protruding toward the side opposite to the reduction device 200 (the right side in FIG. 3A). The inner peripheral surface of the convex portion 148 and the outer peripheral surface of the resin 1134 of the stator 113 of the motor electromagnetic portion 110 are interlocked, inlaying and connecting the concave portion 148 with the resin 1134. With this arrangement, the stator 113 is provided to the bearing support member 140. At this time, the end portion of the motor frame 112 butts against the convex portion 148, playing the role of a butting surface during the inlaying and connecting process. This inlaying and connecting process causes the bearing support member 140 and the stator 113 to be coaxially positioned. Note that the convex portion 148 and the resin 1134 are then fixed by adherence after the inlaying and connecting process.

The advantages achieved by the rotating apparatus 1 described above will now be described.

As described above, the motor 100 comprises the bearing support member 140, which supports the bearings 213 configured to rotatably support the input shaft 211 of the reduction device 200 and pre-compress the bearings 213. The stator 113 is provided to this bearing support member 140. At this time, the input shaft 211 of the reduction device 200 and the rotating shaft 101 of the motor 100 are integrally formed and coaxial. As a result, the rotor 111 and the stator 113 are substantially positioned by the bearing support member 140 as a single member. With this arrangement, the coaxiality of the rotor 111 and the stator 113 of the rotating electrical machine 100 is improved. Further, the bearing support member 140 functions partially as an installation member of the stator 113, a support member of the bearings 213, and a pre-compressing member, thereby reducing the number of parts and permitting efficient assembly of the rotating apparatus 1.

Further, in particular, according to the embodiment, the housing 201 of the reduction device 200 is splittably configured in the direction orthogonal to the axial direction of the input shaft 211. With such a configuration, as shown in the example in FIG. 3B, a dimensional difference sometimes occurs between the two housing portions 201$u$ and 201$d$. In such a case, that dimensional difference may cause a step 209 to occur at the meeting section of the housing portions at the through-hole 202$b$ on the motor electromagnetic portion 110 side. In this case, when the structure is a general structure in which the bearings fit into the through-hole 202$b$, for example, it becomes difficult to fit the bearings as is into the through-hole 202$b$ since the inner diameter of the through-hole 202$b$ and the outer diameter of the bearings substantially match. As a result, a cutting operation for removing the step 209 of the through-hole 202$b$ is required, further necessitating time and labor for rotating apparatus assembly.

In response, according to the rotating apparatus 1 of this embodiment, the bearing support member 140 is provided to the through-hole 202$b$ of the housing 201 with the bearings 213 supported. At this time, the outer diameter of the support portion 142 of the bearing support member 140 is smaller than the inner diameter of the through-hole 202$b$, forming the gap S between the outer periphery of the support portion 142 and the inner periphery of the through-hole 202$b$. With this arrangement, even in a case where the step 209 occurs at the through-hole 202$b$ as described above, that step 209 is permitted by the gap S, as shown in FIG. 3B. Then, with the step 209 thus permitted, the bearings 213 can be arranged in the through-hole 202$b$. As a result, the cutting operation, etc., for removing the step 209 is no longer required, making it possible to simply install the bearings 213 to the housing 201. This makes it possible to efficiently perform the assembly work of the rotating apparatus 1. Further, by permitting a relative margin in the dimensional difference between the outer diameter of the support portion 142 and the inner diameter of the through-hole 202$b$, the bearings 213 can be reliably provided even in a case where the step 209 that occurs at the through-hole 202$b$ is large.

Further, according to the flange portion 143 of the bearing support member 140, the diameter of the bolt hole 147 is formed larger than the bolt 208. A gap is then formed around the periphery of the bolt 208 within each bolt hole 147. With this gap of the bolt hole 147 and the gap S between the outer periphery of the support portion 142 and the inner periphery of the through-hole 202$b$, the bearing support member 140 can be fixed at any position with respect to the housing 201. That is, the bearing support member 140 can be fixed while shifting its position in the axial direction of the input shaft 211, in an amount equivalent to the gap in the perpendicular plane direction. Accordingly, even in a case where the center position of the through-hole 202$b$ deviates from the position of the axis of the input shaft 211 by the dimensional difference of the housing portions 201$u$ and 201$d$, it is possible to fix the bearings 213 while maintaining a position that is coaxial with the input shaft 211.

Further, in particular, according to the embodiment, the bearing support member 140 comprises the support portion 142 and the flange portion 143. The support portion 142 comprises the opening 144 to which the bearings 211 are fit, and the outer diameter thereof is configured smaller than the inner diameter of the through-hole 202$b$. With this arrangement, when the bearing support member 140 is fixed to the housing 201, the gap S can be reliably formed between the outer periphery of the support portion 142 and the inner periphery of the through-hole 202$b$. Then, the bearings 211 can be arranged inside the through-hole 202$b$ while forming that gap S. On the other hand, the outer diameter of the flange portion 143 is configured larger than the inner diameter of the through-hole 202$b$. With this arrangement, the bearing support member 140 can be reliably fixed to the housing 201 by bolt tightening using the flange portion 143 positioned outside the through-hole 202$b$.

Further, in particular, according to the embodiment, the flange portion 143 of the bearing support member 140 comprises the convex portion 148 that is inlayed in and connects to the resin 1134 of the stator 113 of the motor 100. With this arrangement, when the motor 100 is installed to the reduction device 200 during the assembly of the rotating apparatus 1, the convex portion 148 and the stator 113 are inlayed and connected together. With this arrangement, the stator 113 is positioned in a predetermined positioned and easily installed to the bearing support member 140. Accordingly, the task of positioning the motor 100 is no longer required, and the workability of assembly is improved.

Further, during the assembly work, the input shaft 211 is inserted through the bearings 213 supported by the bearing support member 140, and the bearing support member 140 is installed to the input shaft 211. Subsequently, the convex portion 148 of the bearing support member 140 and the stator 113 of the motor 100 are inlayed and connected together, installing the stator 113 to the bearing support member 140. At this time, when the bearing support member 140 is initially installed to the input shaft 211, the bearing support member 140 and the input shaft 211 are mutually coaxial. Further, when the convex portion 148 of the bearing support member 140 and the stator 113 of the motor 100 are subsequently inlayed and connected together, the bearing support member 140 and the stator 113 are mutually coaxial. Further, the input shaft 211 of the reduction device 200 and the rotating shaft 101 of the motor 100 are integrally formed and therefore coaxial. As a result, when the motor 100 is installed to the reduction device 200, the rotor 111 and the stator 113 are positioned so that they are mutually coaxial via the bearing support member 140. This makes it possible to improve the assembly accuracy of the rotating apparatus 1.

Furthermore, the stator 113 of the motor 100 is directly inlayed in and connected to the bearing support member 140. With this arrangement, compared to a structure in which a bracket of the motor 100 is installed to the bearing support member 140, for example, the bracket is no longer required. This makes it possible to reduce the size of the motor 100 (that is, the rotating apparatus 1).

Note that the present disclosure is not limited to the above-described disclosed embodiment, and various modifications may be made without deviating from the spirit and scope of the disclosure. The following describes such modifications one by one.

(1) When the Bearing Support Member is Also Provided to the Encoder Portion Side While, according to the above embodiment, only the bearings 213 on the motor electromagnetic portion 110 side are supported by the bearing support member 140, the present disclosure is not limited thereto. That is, a configuration wherein the bearings 213 on the encoder portion 120 side are also supported by a bearing support member is permitted.

Figure 4:
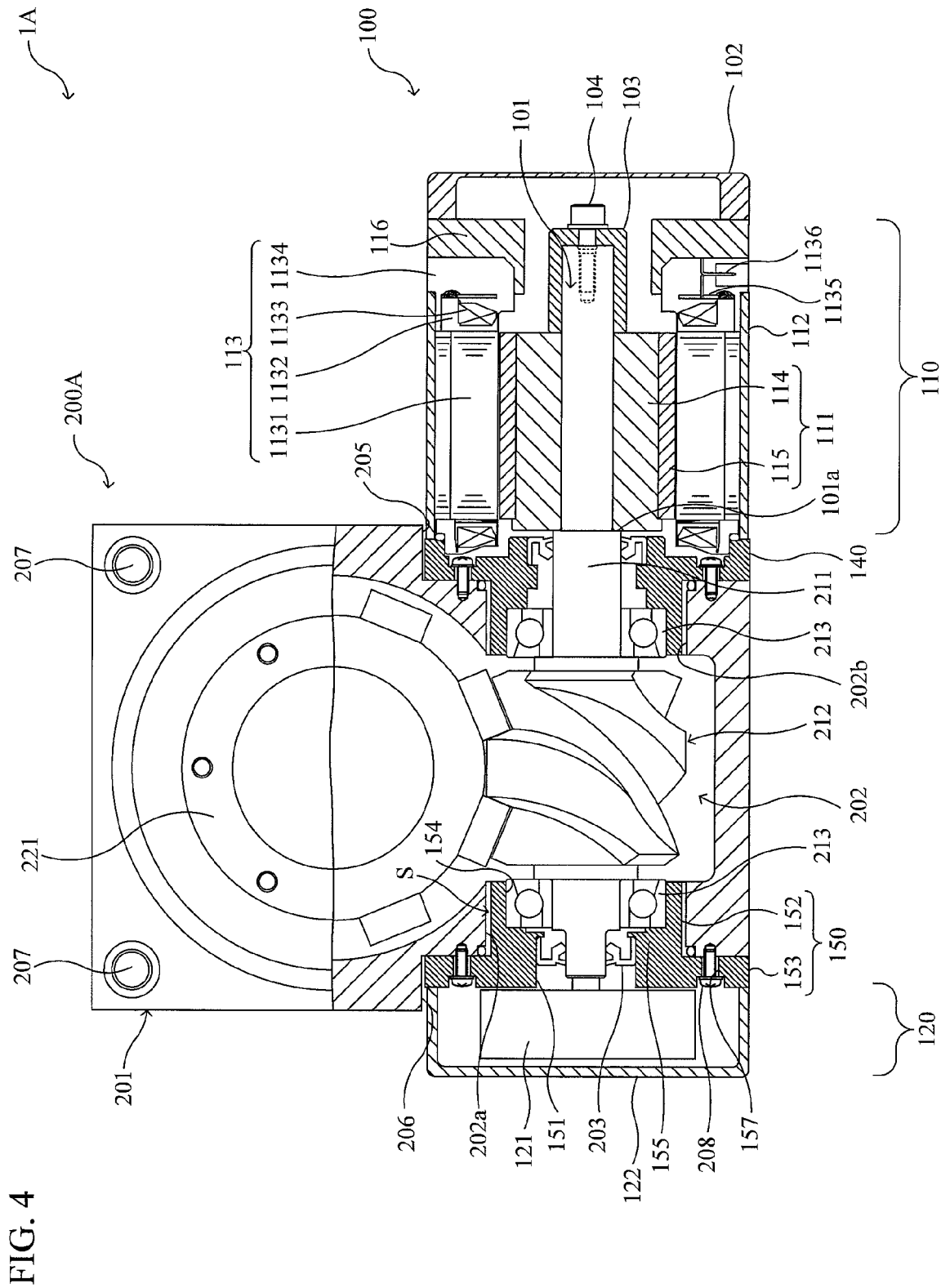
FIG. 4 is a longitudinal cross-sectional view illustrating the overall configuration of the rotating apparatus of a modification wherein a bearing support member is also provided to the encoder portion side.

FIG. 4 is a longitudinal sectional view illustrating the overall configuration of a rotating apparatus according to this modification. In FIG. 4, sections that are the same as those in FIG. 1 are given the same reference numerals, and descriptions thereof are suitably omitted. As shown in FIG. 4, in a reduction device 200A of a rotating apparatus 1A, a bearing support member 150 configured to support the bearings 213 is fixed to the through-hole 202a on the encoder portion 120 side as well.

The bearing support member 150, similar to the bearing support member 140, is a circular member comprising a through-hole 151 at its center, through which the input shaft 211 is inserted. This bearing support member 150 comprises a support portion 152 and a flange portion 153. The outer diameter of the support portion 152 is smaller than the inner diameter of the through-hole 202a of the housing 201, on the side of the encoder portion 120. The outer diameter of the flange portion 153 is larger than the inner diameter of the through-hole 202a. With the bearing support member 150 fixed to the through-hole 202a of the housing 201, the support portion 152 is inserted within the through-hole 202a. Further, the flange portion 153 is arranged inside the opening 206 in this example, outside the through-hole 202a. At this time, the outer diameter of the support portion 152 is smaller than the inner diameter of the through-hole 202a, forming the gap S between the outer periphery of the support portion 152 and the inner periphery of the through-hole 202a.

The reduction device 200A side (the right side in FIG. 4) of the through-hole 151 increases in diameter and is open on the surface of the bearing support member 150, on the reduction device 200A side. An opening 154 functions as a fitting portion to which the bearings 213 are fit. A step portion 155 is formed between the through-hole 151 and the opening 154 by the difference in hole diameters. This step portion 155 applies pre-compression to the bearings 213. The oil seal 203 is provided to the through-hole 151 on the side opposite to the reduction device 200A (the left side in FIG. 4).

A bolt hole 157 through which the bolt 208 is inserted in order to fix the bearing support member 150 is formed on the flange portion 153 in a plurality of locations in the peripheral direction, similar to the bearing support member 140. The diameter of the bolt hole 157 is formed larger than the bolt 208, forming a gap around the periphery of the bolt 208, within each of the bolt holes 157. The bolt 208 is inserted through the bolt hole 157 formed on the flange portion 153, and is connected to the housing 201. With this arrangement, the bearing support member 150 is fixed to the through-hole 202a of the housing 201.

The encoder cover 122 is provided to the bearing support member 150, on the side opposite to the reduction device 200A. Note that all components of the rotating apparatus 1A other than the above are configured in the same manner as those of the rotating apparatus 1 of the previously described embodiment.

In this modification as well, the same advantages as those of the previous embodiment are achieved. Further, in addition, even in a case where a step occurs at the through-hole 202a on the encoder portion 120 side, the bearings 213 can be arranged in the through-hole 202a while permitting the step with the gap S.

Figure 5:
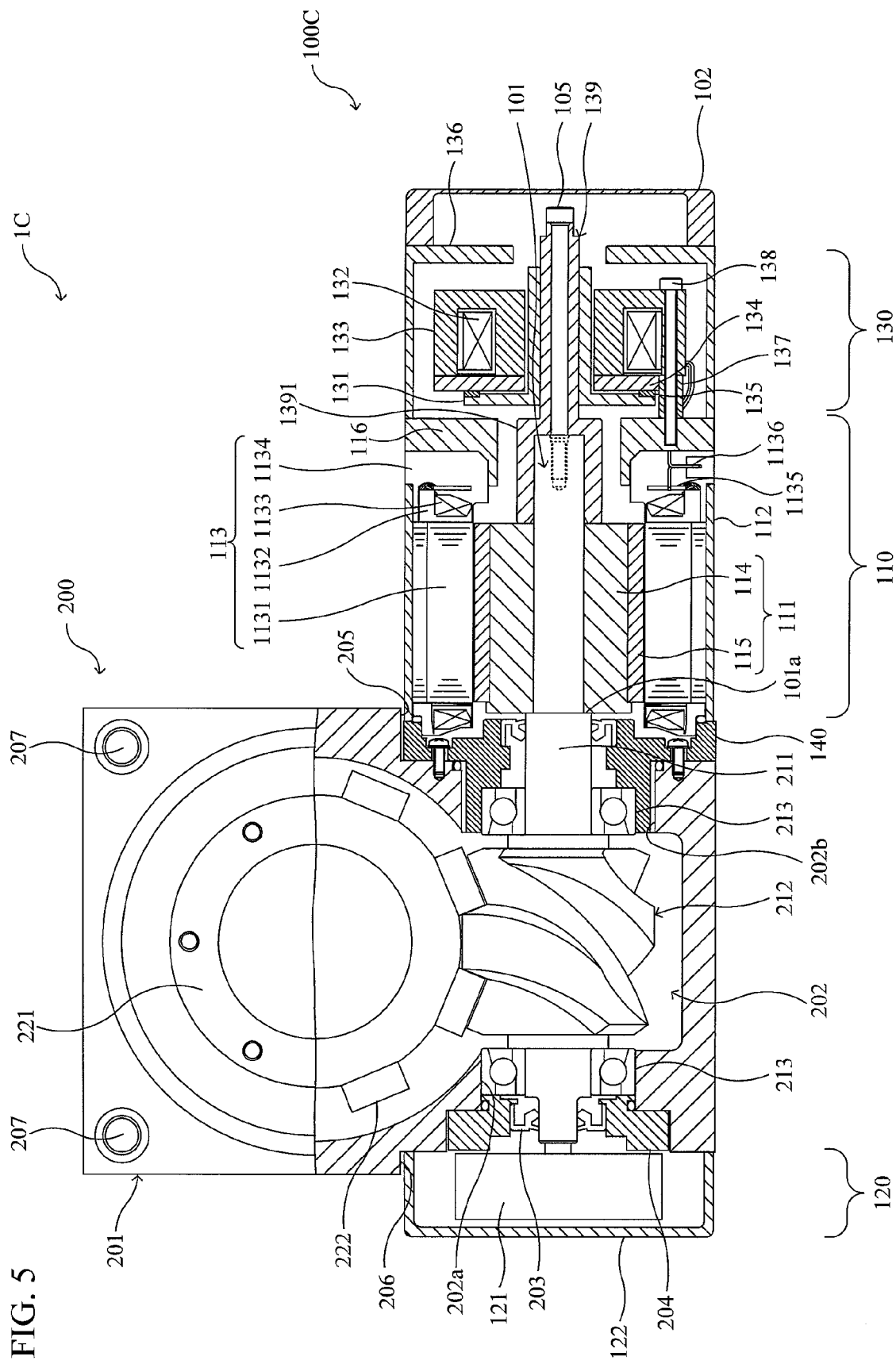
FIG. 5 is a longitudinal cross-sectional view illustrating the overall configuration of the rotating apparatus of a modification wherein the reduction device further comprises a brake portion and the brake shaft and yoke presser form an integral structure.

(2) When the Reduction Device Further Comprises a Brake Portion and the Brake Shaft and Yoke Presser are Integrally Formed FIG. 5 is a longitudinal sectional view illustrating the overall configuration of a rotating apparatus according to this modification. In FIG. 5, sections that are the same as those in FIG. 1, etc., are given the same reference numerals, and descriptions thereof are suitably omitted. As shown in FIG. 5, in a rotating apparatus 1C of this modification, a motor 100C comprises the motor electromagnetic portion 110, the encoder portion 120, and a brake portion 130. The motor electromagnetic portion 110 and the brake portion 130 are adjacently disposed.

The brake portion 130 is a power-off activated type electromagnetic brake that brakes the rotating shaft 101 on the side opposite to the reduction device 200 (the right side in FIG. 5). The brake portion 130 is disposed adjacent to the motor electromagnetic portion 110, on the side opposite to the reduction device 200. This brake portion 130 comprises a brake shaft 139, a brake disk 131, a field core 133, and an armature 134. The brake shaft 139 is connected to the rotating shaft 101, on the side opposite to the reduction device 200. The brake disk 131 is fixed to the outer peripheral portion of the brake shaft 139 by adherence or a set screw (not shown), etc. The field core 133 houses the exciting coil 132 and a spring (not shown). The armature 134 is disposed on the reduction device 200 side (the left side in FIG. 5) so that it faces the field core 133. The brake portion 130 is fixed to the bracket 116 via a collar 137 by a bolt 138. The brake portion 130 is connected to the input terminal 113b via a lead wire.

The spring housed in the field core 133 activates a biasing force that presses the armature 134 toward the reduction device 200 side. The armature 134 is formed into a discoid by a suitable magnetic material (such as steel, for example). The armature 134 is movably disposed in the axial direction only (horizontal direction in FIG. 5) between the field core 133 and the brake disk 131. A friction material 135 is provided to the lateral surface of the brake disk 131, on the side opposite to the reduction device 200.

The brake shaft 139 is detachably connected to the rotating shaft 101 by a bolt 105. The bolt 105 inserts through the brake shaft 139 in the axial direction, and connects to the end portion of the rotating shaft 101. Further, the brake shaft 139 integrally comprises a yoke pressing portion 1391 on the axial end side (the left end side in FIG. 5). The yoke pressing portion 1391 prevents the yoke 114 of the rotor 111 of the motor electromagnetic portion 110 from shifting in position in the axial direction of the rotating shaft 101. The yoke pressing portion 1391 is formed into a cylindrical shape, and fixed so that it covers the end portion of the rotating shaft 101.

Each device that constitutes the brake portion 130 is housed inside a brake cover 136. Further, the previously described cover 102 is provided to the brake cover 136, on the side opposite to the reduction device 200.

The operation of the brake portion 130 having a configuration such as the above will now be described.

In a state in which the exciting coil 132 is not energized (=power-off state), braking is performed by the brake portion 130. That is, in a power-off state, the armature 134 is pressed by the spring, causing the armature 134 to move toward the reduction device 200 side and contact the friction material 135. As a result, the brake disk 131 is dampened, braking the rotation of the brake shaft 139 and the rotating shaft 101. On the other hand, in a state in which the exciting coil 132 is energized (=power-on state), braking is not performed by the brake portion 130. That is, in a power-on state, the exciting coil 132 exerts a magnetic attractive force on the armature 134, toward the side opposite to the reduction device 200. With this arrangement, the armature 134 resists the biasing force of the spring and moves toward the side opposite to the reduction device 200. As a result, the armature 134 is separated from the friction material 135 and released from the above braking, enabling rotation of the brake shaft 139 and the rotating shaft 101.

Note that all components of the rotating apparatus 1C other than the above are configured in the same manner as those of the rotating apparatus 1 of the previously described embodiment.

According to the modification described above, the brake shaft 139 comprises the yoke pressing portion 1391. With this arrangement, it is possible to prevent the yoke 114 from coming off the rotating shaft 101 and improve the reliability of the motor 100C (that is, the rotating apparatus 1C). Further, the brake shaft 139 integrally comprises the yoke pressing portion 1391. As a result, compared to a case where the parts are comprised separately, it is possible to reduce the number of parts and the cost. Further, while the tasks of centering and connecting are required when these parts are provided separately, these tasks are no longer required when the parts are integrated. It is therefore possible to reduce the number of man-hours required for assembly and achieve efficient assembly. Furthermore, the brake shaft 139 is detachable from the rotating shaft 101. With this arrangement, in a case where the brake portion 130 is not required in the motor 100C, only the yoke presser (the yoke presser 103 shown in FIG. 1, for example) is connected to the rotating shaft 101, in place of the brake shaft 139. With this arrangement, flexible accommodation is possible. This then make is possible to prevent the yoke 114 from coming off the rotating shaft 101 and achieve the motor 100C (the rotating apparatus 1C) capable of variable shaft length in accordance with brake necessity.

(3) When the Brake Shaft, Yoke Presser, and Brake Disk are Integrally Formed

Figure 6:
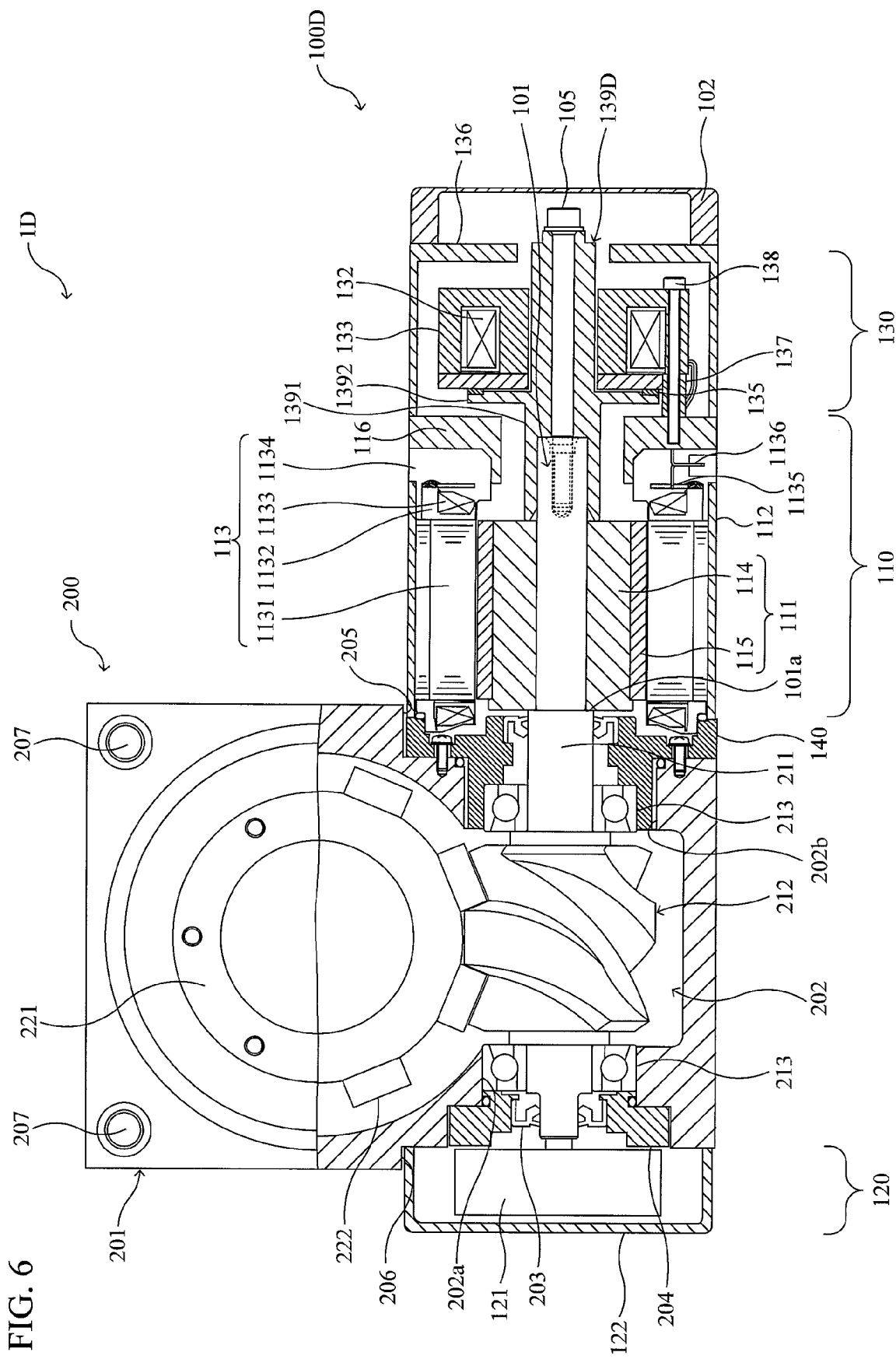
FIG. 6 is a longitudinal cross-sectional view illustrating the overall structure of the rotating apparatus of a modification in which the brake shaft, yoke presser, and brake disk form an integral structure.

FIG. 6 is a longitudinal sectional view illustrating the overall configuration of a rotating apparatus according to this modification. In FIG. 6, sections that are the same as those in FIG. 5, etc., are given the same reference numerals, and descriptions thereof are suitably omitted. As shown in FIG. 6, in a rotating apparatus 1D of this modification, the brake portion 130 of a motor 100D comprises a brake shaft 139D. Further, this brake shaft 139D integrally comprises the yoke pressing portion 1391 on the axial end side (the left end side in FIG. 6). Further, the brake shaft 139D integrally comprises a brake disk portion 1392 on its outer peripheral side for braking the brake shaft 139D. The friction material 135 is provided to the lateral surface of the brake disk portion 1392, on the side opposite to the reduction device 200. Further, the brake shaft 139D is detachably connected to the rotating shaft 101 by the bolt 105.

Note that all components of the rotating apparatus 1D other than the above are configured in the same manner as those of the rotating apparatus 1C of the previously described modification (2).

Further, according to this modification described above, the brake shaft 139D integrally comprises the brake disk portion 1392 for braking the brake shaft 139D. With this arrangement, compared to a case where the parts are comprised separately, it is possible to reduce the number of parts and the cost. Further, while the tasks of centering and connecting are required when these parts are provided separately, these tasks are no longer required when the parts are integrated. This makes it possible to reduce the number of man-hours required for assembly and achieve efficient assembly. Furthermore, in a case where the brake shaft and brake disk are separately provided, a key and a key groove need to be formed therein to prevent the brake disk from shifting position in the rotating direction. In this case, the key and the key groove are unbalanced elements, resulting in the risk of shaft vibration. According to this embodiment, the key and the key groove are no longer required due to the integrated structure, making it possible to eliminate the unbalanced elements and suppress shaft vibration. Further, since it is possible to increase the coaxiality further than a case where the parts are provided separately, this also makes it possible to suppress shaft vibration.

(4) When the Yoke and the Yoke Presser are Integrally Formed

While the previous embodiment describes an illustrative scenario in which the yoke 114 and the yoke presser 103 are separately provided, these parts may be integrally formed.

Figure 7:
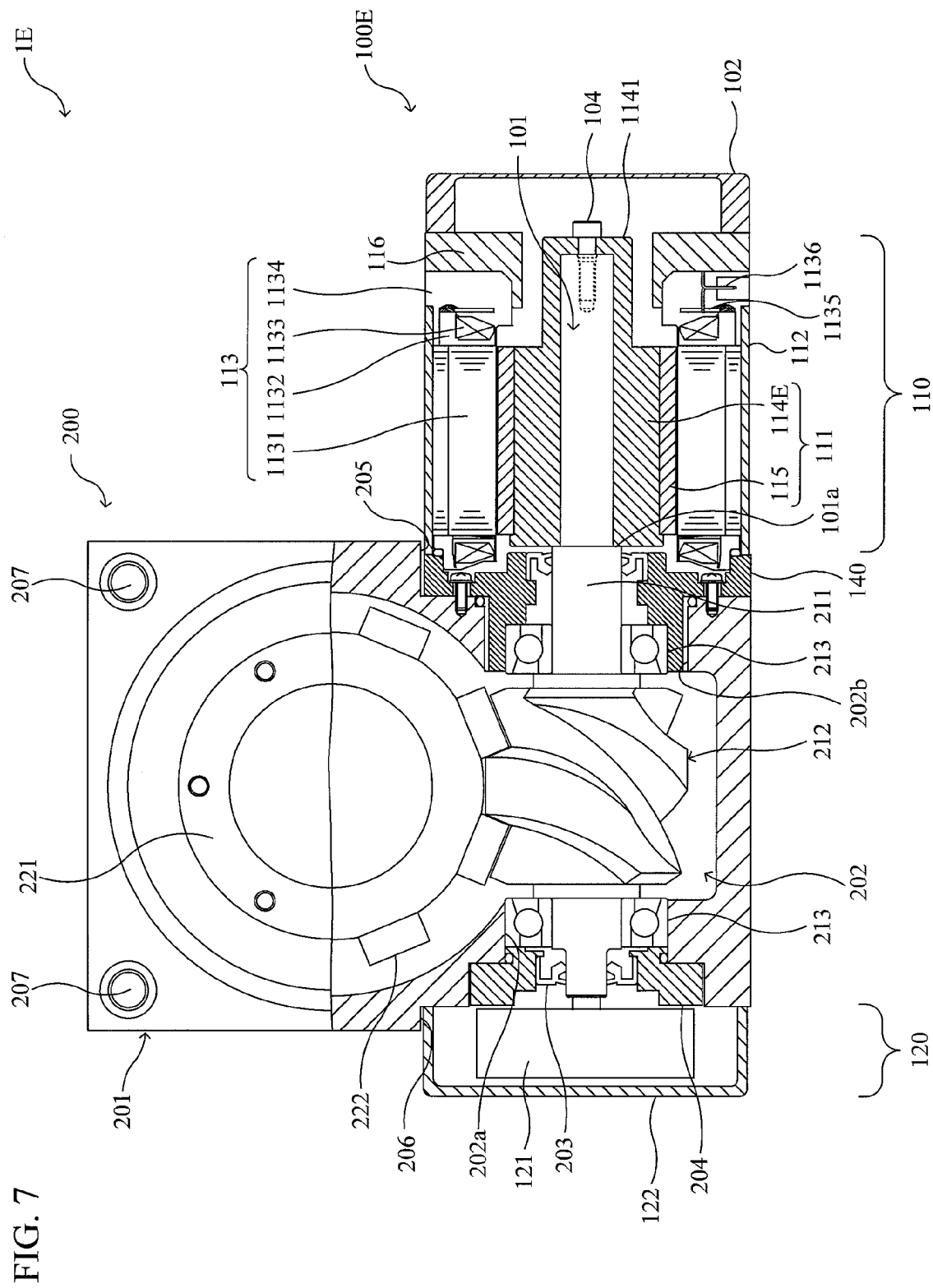
FIG. 7 is a longitudinal cross-sectional view illustrating the overall structure of the rotating apparatus of a modification in which the yoke and yoke presser form an integral structure.

FIG. 7 is a longitudinal sectional view illustrating the overall configuration of a rotating apparatus according to this modification. In FIG. 7, sections that are the same as those in FIG. 1, etc., are given the same reference numerals, and descriptions thereof are suitably omitted. As shown in FIG. 7, in a motor 100E of a rotating apparatus 1E, a yoke 114E of the rotor 111 integrally comprises a yoke pressing portion 1141. The yoke pressing portion 1141 prevents the yoke 114E from shifting position in the axial direction of the rotating shaft 101. The yoke 114E is fixed by connecting the yoke pressing portion 1141 to the rotating shaft 101 by the bolt 104. Note that all components of the rotating apparatus 1E other than the above are configured in the same manner as those of the rotating apparatus 1 of the previously described embodiment.

According to this modification, the yoke 114E integrally comprises the yoke pressing portion 1141, and the yoke pressing portion 1141 is fixed to the rotating shaft 101 by the bolt 104. With this arrangement, it is possible to prevent the yoke 114E from coming off the rotating shaft 101 and improve the reliability of the motor 100E (that is, the rotating apparatus 1E). Further, since the yoke 114E integrally comprises the yoke pressing portion 1141, it is possible to reduce the number of parts and the cost in comparison to a case where these parts are provided separately. Further, while the tasks of centering and connecting are required when these parts are provided separately, these tasks are no longer required when the parts are integrated. This makes it possible to reduce the number of man-hours required for assembly and achieve efficient assembly.

(5) When the Yoke, Yoke Presser, and Brake Shaft are Integrally Formed

Figure 8:
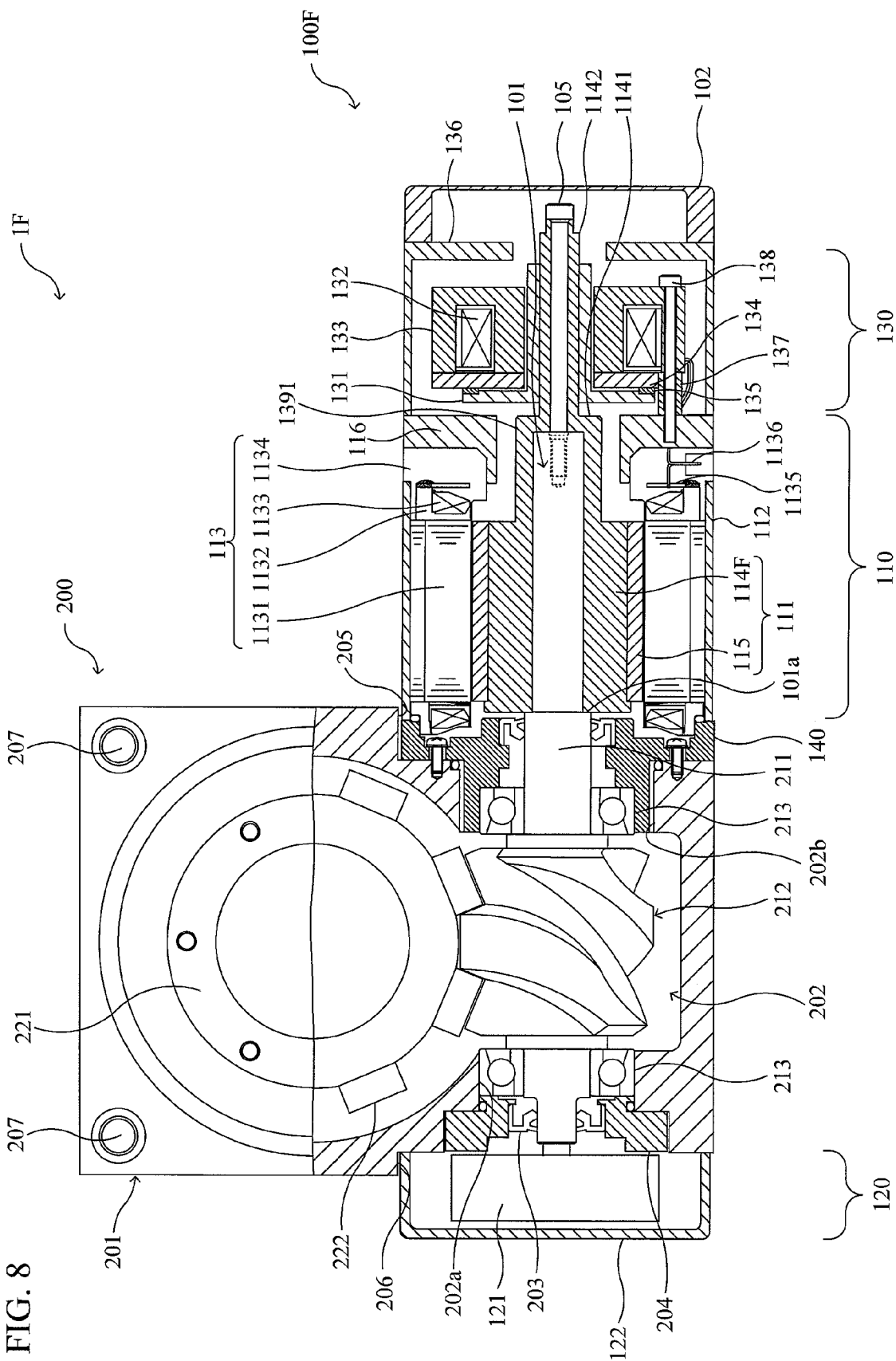
FIG. 8 is a longitudinal cross-sectional view illustrating the overall structure of the rotating apparatus of a modification in which the yoke, yoke presser, and brake shaft form an integral structure.

FIG. 8 is a longitudinal sectional view illustrating the overall configuration of a rotating apparatus according to this modification. In FIG. 8, sections that are the same as those in FIG. 7 are given the same reference numerals, and descriptions thereof are suitably omitted. As shown in FIG. 8, in a rotating apparatus 1F of this modification, a motor 100F comprises the motor electromagnetic portion 110, the encoder portion 120, and the brake portion 130. In the motor 100F, the yoke 114F of the rotor 111 integrally comprises the yoke pressing portion 1141. Further, the yoke 114F integrally comprises a brake shaft portion 1142. The bolt 105 inserts through a brake shaft portion 1142 in the axial direction, and connects to the end portion of the rotating shaft 101. The yoke 114F and the yoke pressing portion 1141 are fixed by connecting the brake shaft portion 1142 to the rotating shaft 101 by the bolt 105. Note that all components of the rotating apparatus 1F other than the above are configured in the same manner as those of the rotating apparatus 1C of the previously described modification (2).

According to the modification described above, the yoke 114F integrally comprises the yoke pressing portion 1141 and the brake shaft portion 1142. With this arrangement, compared to a case where the parts are comprised separately, it is possible to reduce the number of parts and the cost. Further, while the tasks of centering and connecting are required when these parts are provided separately, these tasks are no longer required when the parts are integrated. This makes it possible to reduce the number of man-hours required for assembly and achieve efficient assembly. Furthermore, with the integration of the yoke 114F, the yoke pressing portion 1141, and the brake shaft portion 1142, the coaxiality can be made higher than in a case where these parts are separately provided. With this arrangement, it is possible to suppress shaft vibration.

(6) When Using a Reduction Device in Which the Input Shaft and Output Shaft are Arranged in Parallel While the above describes an illustrative scenario in which a roller gear reduction device is used wherein the axial directions of the input shaft and the output shaft are substantially orthogonal, the present disclosure is not limited thereto. That is, the present disclosure allows use of a reduction device in which the input shaft and the output shaft are arranged in parallel. In this modification, a case where a planetary reduction device is used as the reduction device in which the input shaft and output shaft are arranged in parallel is described as an example.

Figure 9:
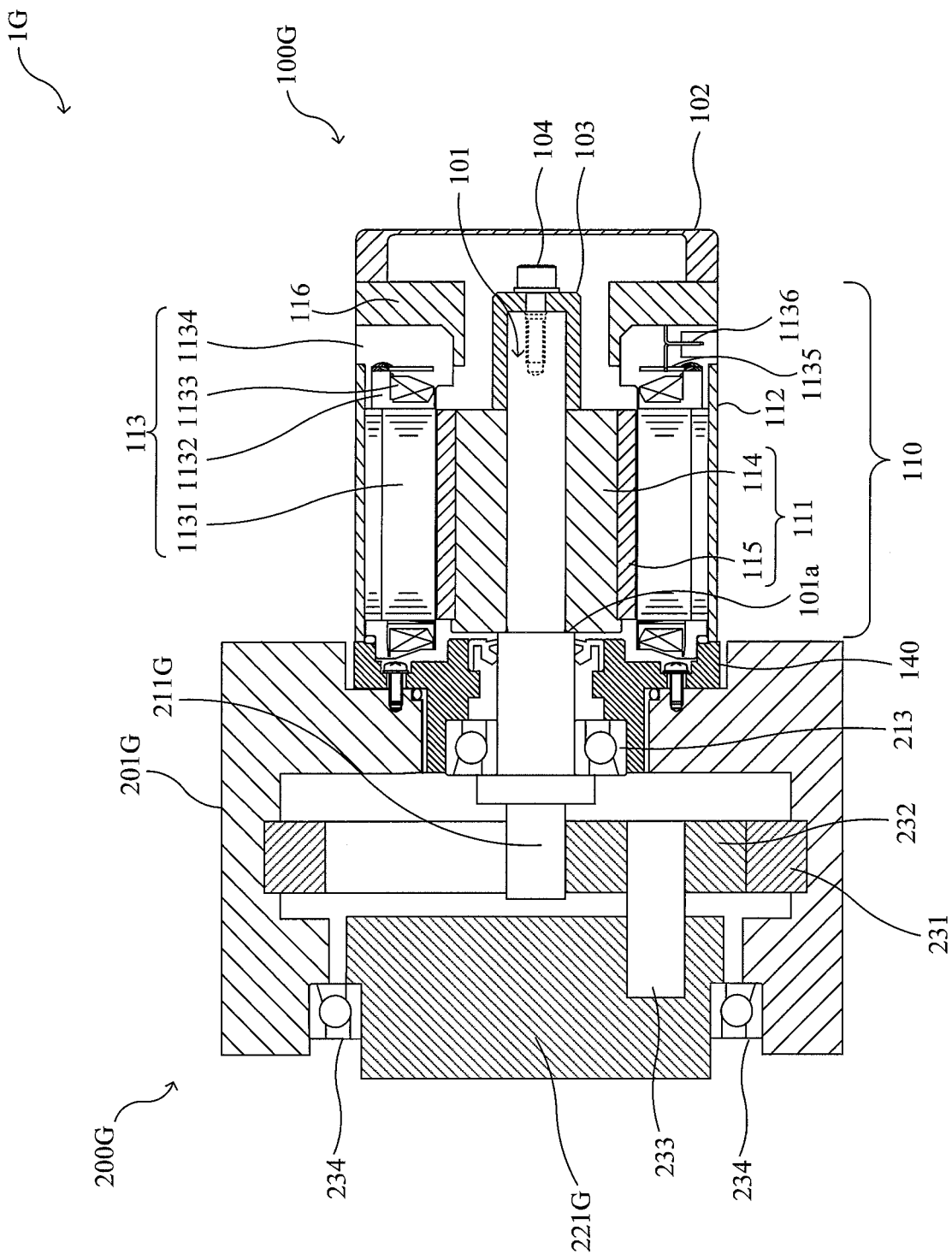
FIG. 9 is a longitudinal cross-sectional view illustrating the overall configuration of a rotating apparatus of a modification that uses a reduction device in which the input shaft and the output shaft are arranged in parallel.

FIG. 9 is a longitudinal sectional view illustrating the overall configuration of a rotating apparatus according to this modification. In FIG. 9, sections that are the same as those in FIG. 1, etc., are given the same reference numerals, and descriptions thereof are suitably omitted. As shown in FIG. 9, a reduction device 200G comprises a housing 201G, an input shaft 211G of a solar roller, a ring 231, a plurality of planetary rollers 232, an output shaft 221G, and bearings 234. The input shaft 211G is coaxially and integrally formed with the rotating shaft 100 of the motor 100G. The ring 231 is fixed to the housing 201G. The plurality of planetary rollers 232 is arranged equidistant in the peripheral direction between the ring 231 and the input shaft 211G. The output shaft 221G is rotated by a planetary roller shaft 233 of the plurality of planetary rollers 232. The bearings 234 rotatably support the output shaft 221G.

The input shaft 211G and the output shaft 221G are coaxially arranged. Further, the bearing support member 140 supports the bearings 213 that rotatably support the input shaft 211G of the reduction device 200G. Further, the bearing support member 140 applies pre-compression to the bearings 213. Note that all components of the rotating apparatus 1G other than the above are configured in the same manner as those of the rotating apparatus 1 of the previously described embodiment. Furthermore, according to the example shown, the motor 100G comprises only the motor electromagnetic portion 110. Nevertheless, the motor 100G may comprise the encoder portion 120 and the brake portion 130. According to this modification having such a configuration as well, the same advantages as those of the previous embodiment are achieved.

Note that while this modification describes an illustrative scenario of a planetary reduction device, the present disclosure allows use of other types of reduction device, such as a harmonic reduction device or a cyclo reduction device.

(7) Other

While the above has described an illustrative scenario in which the housing of the reduction device is split into two, the present disclosure is not limited thereto. That is, the housing does not need to have a split configuration and may be integrally formed as long as the configuration achieves coaxiality between the rotor and stator as well as efficient assembly. Further, in a case where a split configuration is provided, the present disclosure is not limited to a configuration in which the housing is split into two, allowing a configuration in which the housing is split into three or more.

Further, according to FIG. 1 to FIG. 8, the motor electromagnetic portion 110 and the encoder portion 120 are separately arranged on one side and the other side of the reduction device 200. Nevertheless, the present disclosure is not limited thereto, allowing application of the embodiment of the disclosure to a motor having a configuration in which the motor electromagnetic portion 110 and the encoder portion 120 are arranged on one side of the reduction device 200. Further, in such a case, a configuration in which the brake portion 120 is arranged on the other side of the reduction device 200, or a configuration in which the brake portion 120 is not arranged, is also allowed. Furthermore, a configuration in which the motor electromagnetic portion 110, the brake portion 120, and the encoder portion 130 are all arranged on one side of the reduction device 200 is also possible. In these modification as well, the same advantages as those of the embodiment are achieved.

While the above has described an illustrative scenario in which the motor 100 comprises a field system that includes the yoke 114 and the magnet 115 as the rotor, and an armature that includes the bobbin 117, etc., as the stator, the present disclosure is not limited thereto. Conversely, the motor may provide a field system that includes a yoke and a magnet to the motor frame as the stator, and an armature that includes a bobbin, etc., to the rotating shaft as the rotor. In this case as well, the same advantages as those of the embodiment are achieved.

Further, in addition to the examples described above, the techniques of the above-described embodiment and exemplary modifications may also be suitably combined.

Although other examples are not individually described herein, various changes and modifications can be made without departing from the spirit and scope of the present disclosure.

What is claimed is:

1. A rotating electrical machine that is integrally formed with a reduction device having an input shaft and an output shaft and employs one of a field system and an armature as a rotor and the other of the field system and the armature as a stator, comprising:

a rotating shaft to which said rotor is fixed and that is coaxially connected to said input shaft of said reduction device; and a bearing support member configured to support bearings that rotatably support said input shaft of said reduction device; wherein:

said stator is provided to said bearing support member, and
said bearing support member is provided so as to face a through-hole of a housing of said reduction device so that there is a gap between said bearing support member and said through-hole, said housing comprising said through-hole through which said input shaft is inserted, and being splittable in a direction orthogonal to an axial direction of said input shaft.

2. The rotating electrical machine according to claim 1, wherein:
said bearing support member comprises:
a support portion having a fitting portion to which said bearings are fit and having an outer diameter that is smaller than an inner diameter of said through-hole; and
a flange portion having an outer diameter that is larger than the inner diameter of said through-hole.

3. The rotating electrical machine according to claim 1, wherein:
said bearing support member further comprises an inlaying and connecting portion that inlays in and connects to said stator.

4. The rotating electrical machine according to claim 1, further comprising:
a yoke presser that is detachably connected to said rotating shaft and prevents a yoke of said rotor from shifting position in an axial direction of said rotating shaft.

5. The rotating electrical machine according to claim 1, further comprising:
a motor electromagnetic portion having said rotor and said rotating shaft; and
a brake portion configured to brake a brake shaft connected to the side of said rotating shaft that is opposite to said reduction device, disposed adjacent to the side of said motor electromagnetic portion that is opposite to said reduction device; wherein:
said brake portion integrally comprises a yoke pressing portion that is detachably connected to said rotating shaft and prevents a yoke of said rotor from shifting position in an axial direction of said rotating shaft.

6. The rotating electrical machine according to claim 5, wherein:
said brake shaft further integrally comprises a brake disk portion for braking said brake shaft.

7. The rotating electrical machine according to claim 1, wherein:
said rotor comprises:
a yoke that is fixed to an outer periphery of said rotating shaft; and
a magnet that is provided to said yoke, and wherein
said yoke integrally comprises a yoke pressing portion configured to prevent said yoke from shifting position in an axial direction of said rotating shaft.

8. The rotating electrical machine according to claim 7, further comprising:
a motor electromagnetic portion having said rotor and said rotating shaft; and
a brake portion configured to brake a brake shaft portion connected to the side of said rotating shaft that is opposite to said reduction device, disposed adjacent to the side of said motor electromagnetic portion that is opposite to said reduction device, and wherein:
said yoke further integrally comprises said brake shaft portion.

9. The rotating electrical machine according to claim 1, further comprising a step portion against which said rotor butts, between said input shaft and said rotating shaft.

10. The rotating electrical machine according to claim 2, wherein:
said bearing support member further comprises a step portion having a diameter smaller than a diameter of said fitting portion.

11. The rotating electrical machine according to claim 1, wherein:
said bearing support member is configured to be mounted within said through-hole of said housing, and wherein said gap is provided between an outer circumferential surface of said bearing support member and an inner surface of said through-hole of said housing.

* * * * *